United States Patent
Kagami et al.

(12)

(10) Patent No.: US 7,002,769 B2
(45) Date of Patent: Feb. 21, 2006

(54) HEAD CONTROL METHOD AND RECORDING APPARATUS

(75) Inventors: Yoshiyuki Kagami, Kawasaki (JP); Isamu Tomita, Kawasaki (JP); Shuichi Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/920,746

(22) Filed: Aug. 18, 2004

(65) Prior Publication Data

US 2005/0041322 A1 Feb. 24, 2005

(30) Foreign Application Priority Data

Aug. 21, 2003 (JP) .............................. 2003-297301

(51) Int. Cl.
 *G11B 5/596* (2006.01)
 *G11B 21/02* (2006.01)

(52) U.S. Cl. .................. 360/77.02; 360/75; 360/77.08

(58) Field of Classification Search ................. 360/29, 360/75, 77.02, 77.08
 See application file for complete search history.

(56) References Cited

U.S. PATENT DOCUMENTS

| | | | |
|---|---|---|---|
| 6,052,250 A * | 4/2000 | Golowka et al. ........ | 360/77.08 |
| 6,151,187 A | 11/2000 | Ogawa .................... | 360/78.14 |
| 6,717,760 B1 * | 4/2004 | Hamaguchi et al. ......... | 360/31 |
| 6,724,562 B1 * | 4/2004 | Ang et al. ............... | 360/78.04 |
| 2004/0136104 A1 * | 7/2004 | Chiao et al. ................ | 360/31 |

* cited by examiner

*Primary Examiner*—David Hudspeth
*Assistant Examiner*—Daniell L. Negrón
(74) *Attorney, Agent, or Firm*—Greer, Burns & Crain, Ltd.

(57) ABSTRACT

There is provided a head control method controlling move of a head on a discoidal recording medium including the steps of: partitioning the discoidal recording medium which has position information recorded thereon at radially equal spacing into a plurality of zones; and demodulating the position information using a coefficient set for each of the zones.

6 Claims, 9 Drawing Sheets

HEAD CONTROL METHOD AND RECORDING APPARATUS

BACKGROUND OF THE INVENTION

1. Field of the Invention

The present invention relates to a recording apparatus having a discoidal recording medium, and to a head control method and a recording apparatus that control the position of a head based on servo information written on the discoidal recording medium.

2. Description of the Related Art

A recording apparatus such as a hard disk drive (hereinafter, referred to as "HDD") having a discoidal recording medium has a device called "head" that detects a magnetic signal recorded on the recording medium such as a disk and that records a magnetic signal onto the recording medium. Then, it is possible to write information and read information recorded on the disk by moving the head on the disk. The position of this head on the disk is controlled according to servo information for positioning-control, written on the disk.

FIG. 8 shows a view featuring the disk contained in the recording apparatus. FIG. 8 shows a quarter of the whole view of the disk. In FIG. 8, information recorded on a disk 1 is stored along a plurality of tracks 4.

The tracks 4 are formed as follows. A plurality of track numbers as a part of the servo information are recorded using integers in an area called servo pattern 3 shown in FIG. 8 and the tracks are formed at points 16 where the track numbers are recorded.

Therefore, the spacing between a track and a track adjacent to it (track pitch) is determined by the spacing between the points 16 where the track numbers are recorded. When the points 16 where the track numbers are recorded are spaced constantly, the tracks 4 formed have a track pitch that is equal spacing (referred to as "constant track pitch").

Recording of the track numbers onto the disk 1 is processed as a part of writing of the servo information. This writing process of the servo information onto the disk 1 needs, as a prerequisite, use of a clean room for which dust control measures are taken. Therefore, to simplify the process and to reduce the processing time as much as possible lead to reduction of the cost of manufacture. For example, when the servo information is recorded such that the tracks have a constant track pitch, the process can be made simple and the processing time can be reduced.

However, conventionally, the servo information is written such that the track pitch is wider in the inner side and the outer side than in the area in the middle of them. FIG. 9 is a graph showing the conventional relation between the distance from the spindle and the track pitch. The axis of ordinate represents the track pitch and the axis of abscissa represents the distance from a spindle 2.

The servo information is written such that the track pitch is wide in an area 91 on the inner side and the track pitch once becomes narrower toward a point "A", however, the track pitch again becomes wider toward an outer edge 12 from a point "B" in an area 93 on the outer side. The track pitch in an intermediate area 92 sandwiched by the areas 91 and 93 is narrower than that in the areas 91 and 93.

This is because the angle (yaw angle) formed by an tangent line 14 of a track at a point where a track number is recorded with a servo pattern and the center line 13 running through the centers of the head 5 and a head arm 7 is not zero (0) on the inner side and the outer side, and is for preventing the head from, on the outer side or the inner side, over-writing on information on a track adjacent to the correct track or reading information in a track adjacent to the correct track as the information in the correct track, due to leak magnetic field generated at the head when the yaw angle is not zero (0).

In order to realize the track pitch shown in FIG. 9, for example, in Japanese Patent Application Laid-Open Publication No. 1999-66776, a method is proposed, in which a disk is partitioned into a plurality of areas (zones) 94 in the direction of the radius and servo information is written with a varied track pitch for each zone.

SUMMARY OF THE INVENTION

However, in the case where the track pitch is varied for each zone, the optimal track pitch for each zone depends on the performance of the head, the position where the head is installed and the amount of leaked magnetic field. Furthermore, as shown in FIG. 10, a plurality of heads 5 are included in the recording apparatus, sandwiching a plurality of disks 1. Therefore, when the optimal track pitch for each zone is calculated for each head and the servo information is recorded varying the track pitch for each zone for each head in response to the result of the calculation, the writing process takes time and this causes an increased cost of manufacture.

The object of the invention is to provide a recording apparatus and a head control method that enable the track to be varied to a desired track pitch once writing of servo information is executed at a constant track pitch.

In order to achieve the above object, according to a first aspect of the present invention there is provided a head control method controlling movement of a head on a discoidal recording medium including the steps of: partitioning the discoidal recording medium which has position information recorded thereon at radially equal spacing into a plurality of zones; and demodulating the position information using a coefficient set for each of the zones.

The coefficient may be a ratio of spacing between positions where the position information is recorded and spacing between positions partitioning each of the zones equally.

In order to attain the above object, according to a second aspect of the present invention there is provided a recording apparatus having a discoidal recording medium; a head for writing information onto or reading written information from the discoidal recording medium; a head driving unit for moving the head on the discoidal recording medium; a control unit for controlling the position of the head; and a storage unit for storing information necessary for the control. The discoidal recording medium has position information recorded thereon at radially equal spacing and is partitioned into a plurality of zones. The storage unit stores in advance a coefficient for each of the zones. The control unit demodulates the position information using the coefficient.

The coefficient is preferably a ratio of spacing between positions where the position information is recorded and spacing between positions partitioning each of the zones equally. The recording apparatus may have a plurality of heads, and the ratio may be set in the storage unit for each of the plurality of heads.

In an embodiment of the invention, writing of servo information may be executed at a constant track pitch; it is not necessary to re-write the servo information that has been already written in order to emulate with software; and the processing time for writing of the servo information can be reduced compared to the time necessary conventionally. Furthermore, the yield of the heads can be held because the track pitch can be set freely according to the performance of the head, and the disk can be partitioned into a plurality of zones and the track pitch can be set for each of the zones.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENT

An embodiment of the invention will now be described with reference to the drawings. It is to be noted, however, that the technical scope of the invention is not limited to that embodiment.

The invention relates to a head control method employed when information is recorded on a disk or information recorded on a disk is read.

First, a recording apparatus to which the head control method of the invention is applied will be described and, thereafter, the embodiment of the head control method of the invention will be described.

Figure 1:
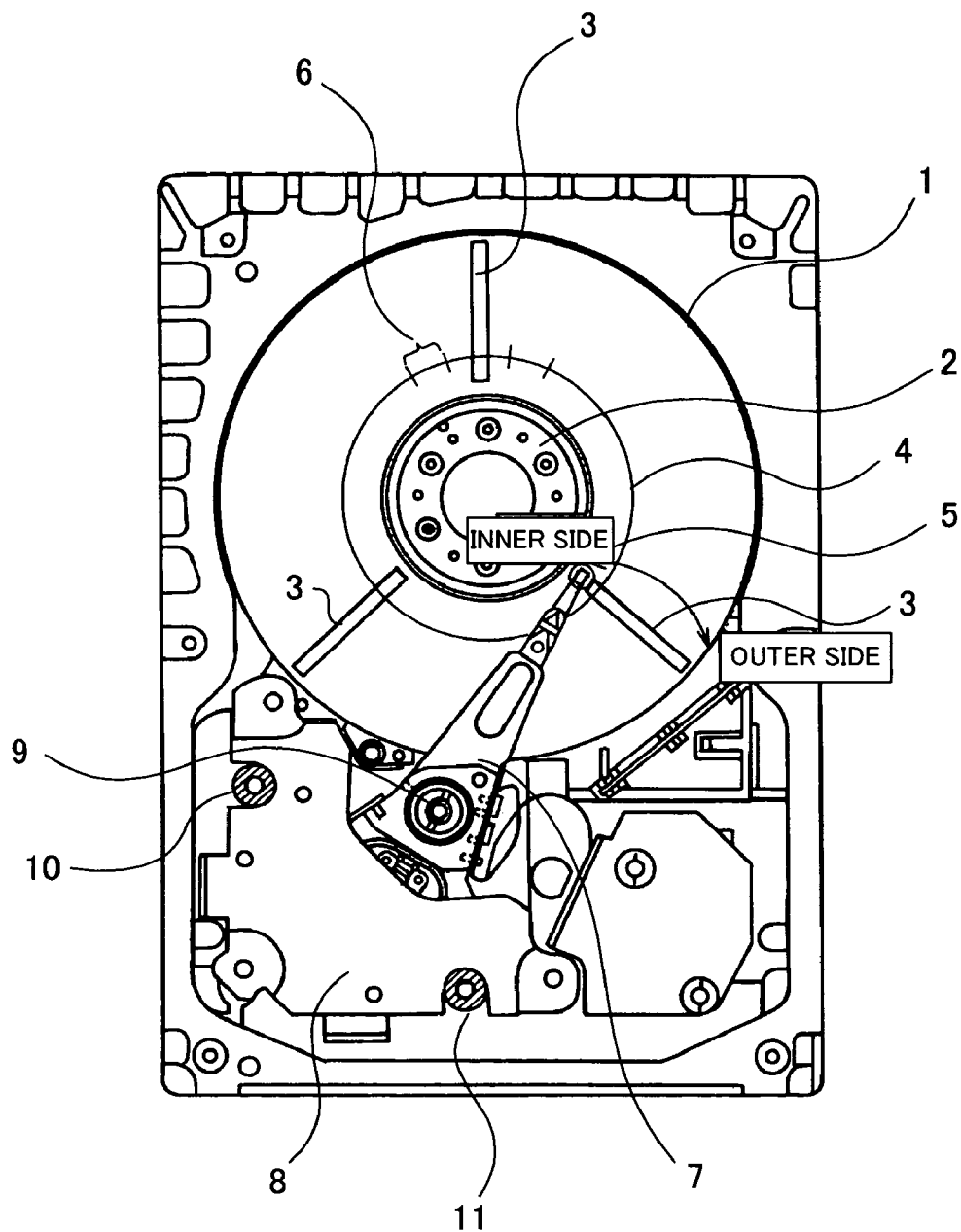
FIG. 1 is an appearance illustrating an internal view of an HDD.

FIG. 1 illustrates an internal view of a recording apparatus to which the head control method of the invention is applied. The disk 1 is a discoidal recording medium rotated by the cylindrical spindle 2. A plurality of servo patterns 3 including the servo information are written radially in advance on the surface of the disk 1. A plurality of tracks 4 are determined concentrically such that points at an equal distance from the center of the spindle 2 fall on the same track number.

A head 5 reads the servo information when it passes over the servo patterns 3 and the servo information having been read is demodulated into position information that identifies the position of the head. For example, the servo information includes the track numbers and the numbers for sectors 6 formed by further partitioning the tracks. These numbers are used as the position information and, therefore, the position of the head on the disk is identified.

The head 5 is held by a head arm 7 and the head arm 7 is coupled to a voice coil motor 8 that drives the head arm 7. The head arm 7 is moved by the voice coil motor 8 such that it draws a circle around the center at a pivot 9.

The range in which the head arm 7 is movable is defined by an outer stopper 10 and an inner stopper 11. The head 5 moves in a predetermined area on the surface of the disk by driving of the head arm 7 by the voice coil motor 8 and by the rotation of the disk 1. Then, reading of data recorded on the tracks 4 and writing of data into the tracks 4 are executed.

Figure 10:
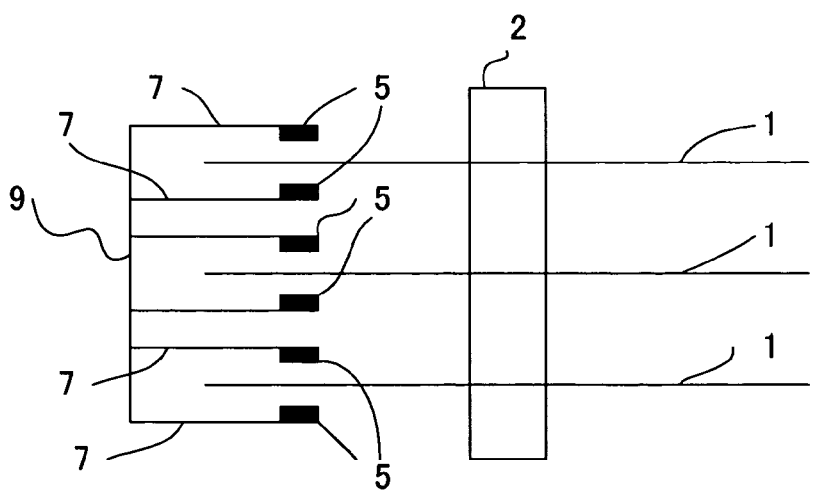
FIG. 10 illustrates a plurality of heads included in the recording apparatus.

The heads 5 are disposed such that they sandwich the disks as shown in FIG. 10. When the plurality of disks 1 are present, the heads are present in the number corresponding to that of the disks. The plurality of servo patterns 3 and the plurality of tracks 4 are present on the disk 1 and the plurality of sectors 6 are present on each of the tracks.

Figure 2:
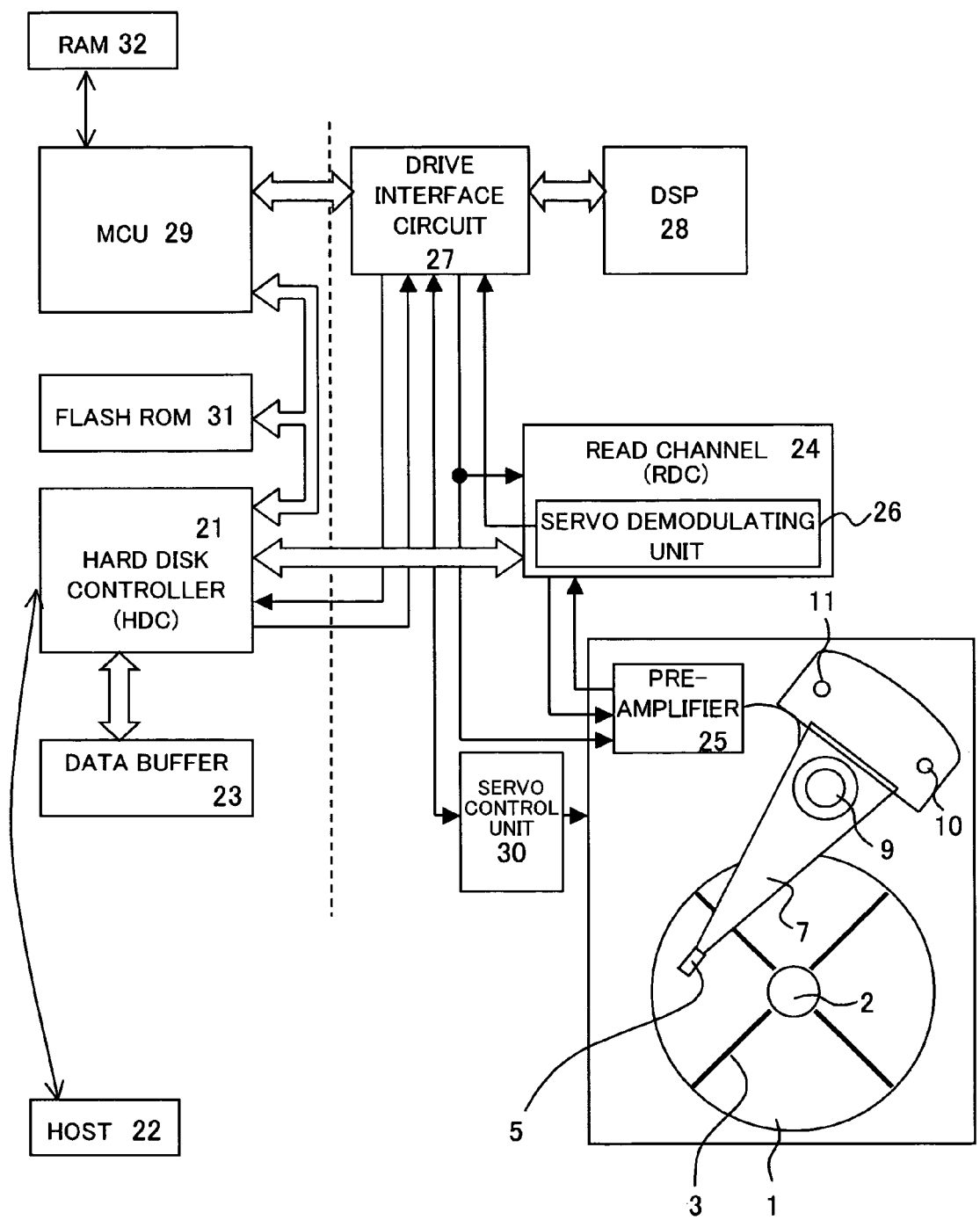
FIG. 2 is a block diagram of the composition of a recording apparatus according to an embodiment of the invention.

FIG. 2 is a block diagram of the composition of the recording apparatus to which the head control method of the invention is applied. The recording apparatus will be described partitioning the description into the flow relating to data to be written on (or read from) the disk and the flow of a control signal for writing data onto (or reading data from) the disk.

A hard disk controller (hereinafter, referred to as "HDC") 21 provides an interface (such as SCSI (Small Computer System Interface) and IDE (Integrated Drive Electronics)) for connecting recording apparatus with a host 22 for ordering writing and reading of data to the disk 1, and controls data communication between the host 22 and the recording apparatus.

The host 22 is a terminal of a computer etc. equipped with a CPU and, to the recording apparatus, designates an address to be a writing position or a reading position and issues writing orders and reading orders. A data buffer 23 is a memory for storing temporarily data used for the data communication to the host 22 and is controlled under HDC 21.

The HDC 21 transmits the data to be written to a read channel (hereinafter, referred to as "RDC") 24 and the RDC 24 transmits the data to be written to a pre-amplifier 25. The pre-amplifier 25 converts the received data into a current for varying a magnetic field that is generated in the head 5, and supplies the current to the head 5. In this manner, the data transmitted from the host 22 are written onto the disk 1.

On the contrary, in reading of data, a current detected by the head 5 in response to the variation of a magnetic signal is amplified by the pre-amplifier 25, is converted into a read signal and is transmitted to the read channel 24 and the read channel 24 demodulates the current into the data recorded on the disk and transmits it to the HDC 21. Then, the HDC 21 transmits the data having been read to the host 22.

In order to execute the above-described writing and reading of data to/from the disk 1 in the recording apparatus, it is necessary to move the head 5 to a target position on the disk corresponding to an address designated by the host 22. In order to move the head 5 to the target position, the current position of the head is grabbed based on the servo information read when the head comes over the servo patterns 3 and whether or not the head has reached the designated address is determined.

The servo information is also the data written on the disk and is detected as a current by the head 5 similarly to the above reading of the data. Then, the pre-amplifier 25 amplifies the current detected by the head and converts it into a read signal and, thereafter, transmits it to the read channel 24.

The read channel 24 includes a servo demodulating unit 26 that demodulates the received current into the position information (the track numbers etc.) of the head. The position information of the head is transmitted to a digital signal processor (hereinafter, referred to as "DSP") 28 via a drive interface circuit 27.

Then, DSP 28 transmits the received position information to a master control unit (hereinafter, referred to as MCU) 29. The MCU 29 orders a servo control unit (Servo Combo IC) 30 to drive the head arm 7. Then, the DSP 28 transmits to the MCU 29 the servo information read every time the head passes over a servo pattern as the head moves. Then, the MCU 29 controls the movement of the head arm 7 until the track number of the read servo information becomes the track number of the target position and the head 5 reaches the target position (the designated address).

The drive interface circuit 27 provides a peripheral circuit necessary for communication between the MCU 29 and the DSP 28 and for control of the read channel 24, the servo control unit 30 and the HDC 21. The MCU 29 is a control unit controlling the above DSP 28 and the HDC 21 and reads and executes a program stored in a flash ROM 31.

The flash ROM 31 stores a program called firmware for controlling the MCU 29 and initial parameters necessary for initializing of the recording apparatus. The flash ROM 31 is provided with a RAM (Random Access Memory) 32 for storing temporarily the result of operations. The flash ROM 31 and the RAM 32 function as a storage unit.

According to the head control method of the embodiment, a disk on which servo information is recorded such that the track pitch is constant is used. In addition, when the range in which the head is movable on the disk is partitioned into a plurality of zones in the direction of the radius, a conversion table for converting an address designated by the host 22 into position information determined based on the servo information is stored in the flash ROM 31 in order that the track pitch is varied for each zone according to the performance of the head. The zones may be plural or may be single.

Next, the conversion table will be described. First, the case where the zone is single will be described. The case where the zone is single is the case where apparent tracks are formed at spacing obtained by multiplying the track pitch based on the servo information by a coefficient and information is recorded on the apparent tracks.

FIGS. 3A and 3B show an example of the case where the zone is single. FIG. 3A shows an example of a conversion table in the case where the zone is single. In FIG. 3A, one (1) zone 41 is set for the whole area of the disk and an apparent number 42 of a track belonging to the zone 41 and a coefficient 43 for converting the apparent number 42 into a track number being based on the actual servo information are stored.

The apparent track number 42 stored in FIG. 3A is a track number that the host recognizes and the product of the apparent track number and the coefficient 43 is the track number being based on the actual servo information. By varying the size of the coefficient 43, the track pitch in the zone can be varied.

FIG. 3B shows a sectional view of the disk in the case where the track pitch is varied based on the conversion table shown in FIG. 3A. FIG. 3B depicts a view of the track being based on the actual servo information and a view of the apparent track that the host recognizes. The outer side is the vicinity of the outer edge of the disk and the inner side is the vicinity of the spindle. The track numbers start with Track Number 0 (zero) from the outer side and they monotonously increases.

When the coefficient 43 is larger than one (1), the apparent tracks are formed at spacing larger than the track pitch being based on the servo information actually written and information is written on those apparent tracks. On the contrary, when the coefficient is smaller than one (1), the apparent tracks are formed at spacing smaller than the constant track pitch. In this manner, the track pitch can be adjusted freely in response to how the coefficient is determined.

The final apparent track number $\alpha 1$ in a zone $z1$ is obtained by multiplying the number x of the track being based on the servo information by the inverse number of f1. That is:

$$\alpha_1 = x \times \frac{1}{f_1} \qquad [\text{Eq. 1}]$$

In this case, the host recognizes that there are $\alpha 1$ tracks present on the disk and, when issuing a writing order or a reading order, designates an address within the range of track numbers (from 0 to $\alpha 1$) as the target position.

Next, the case where the zones are plural will be described. The case where the zones are plural is the case where a plurality of areas, in which apparent tracks are formed at spacing obtained by multiplying the track pitch being based on the servo information by a coefficient, are present on the disk and areas adjacent to each other have different coefficients.

Figure 3:
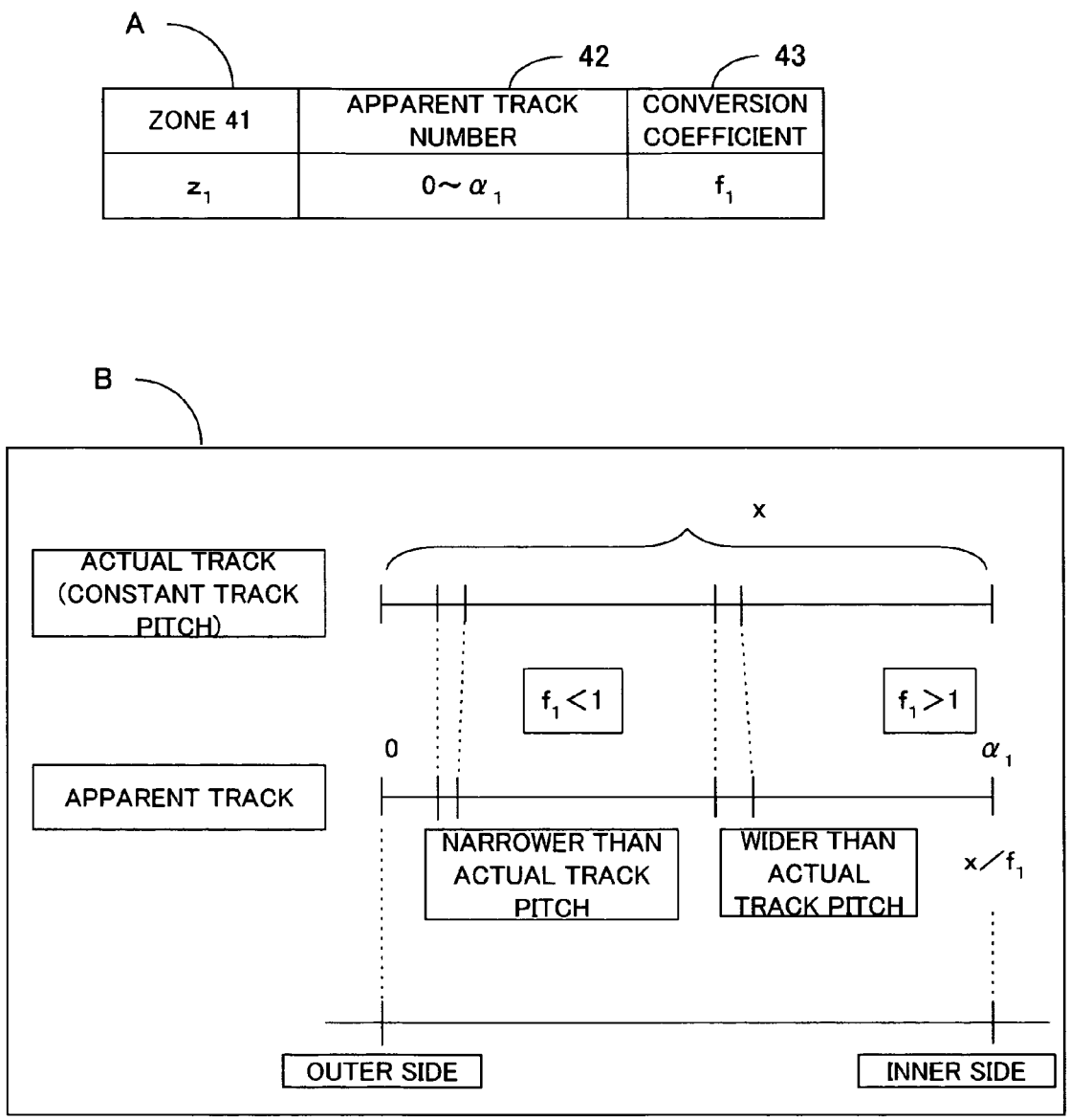
FIGS. 3A and 3B show an example of a case where the zone is single.
Figure 4:
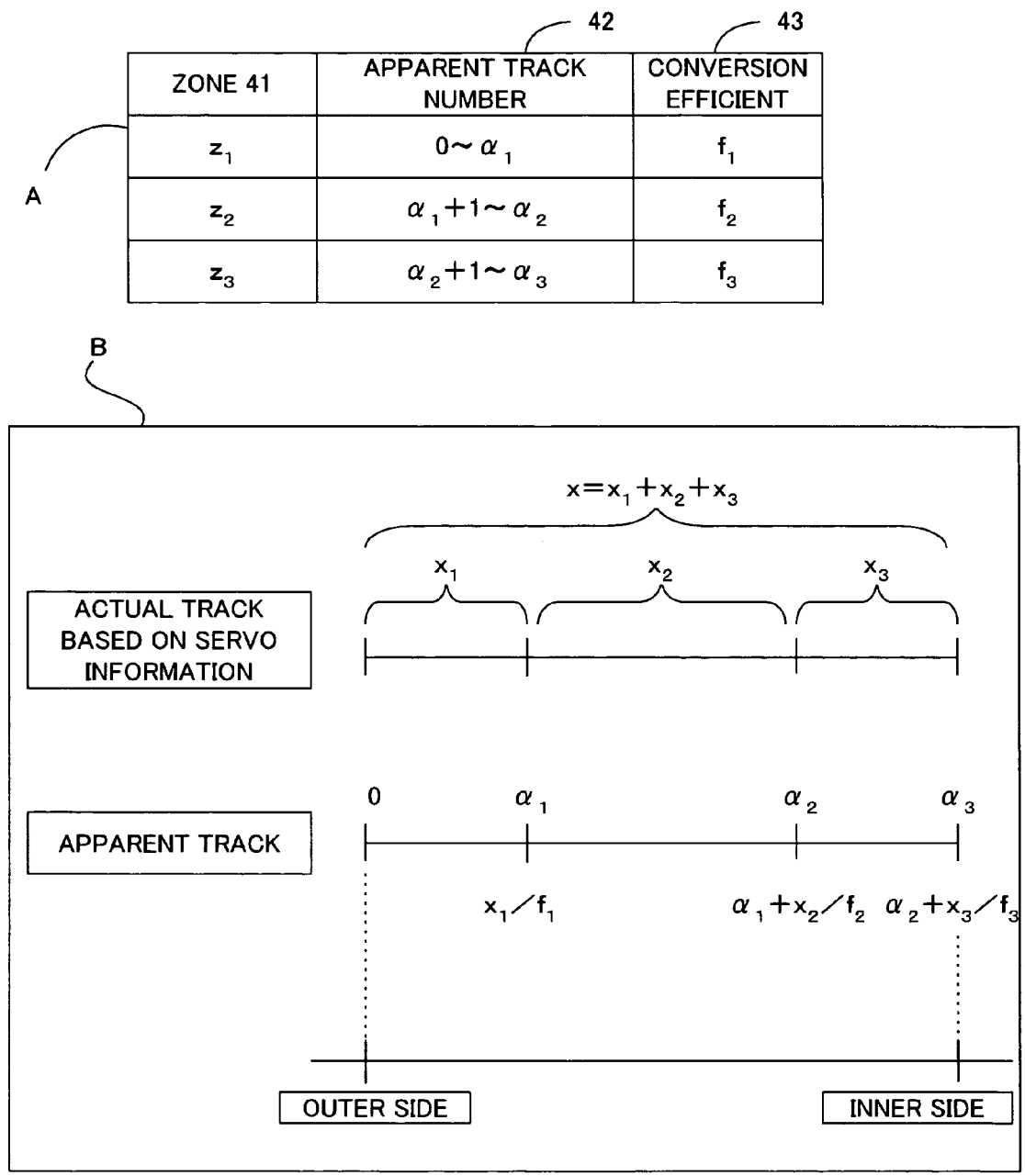
FIGS. 4A and 4B show an example of the case where the zones are plural.

FIGS. 4A and 4B show an example of the case where the zones are plural. Different from FIG. 3, the disk is partitioned into a plurality of zones and the track pitch can be varied for each zone by varying the size of the coefficient.

FIG. 4A shows an example of the conversion table in the case where the zones are plural. In FIG. 4A, the disk is partitioned into three (3) zones 41, and the apparent track number 42 belonging to each of the zones 41 and the coefficient 43 for converting the apparent track number 42 into a track number being based on the actual servo information are stored for each zone.

FIG. 4B shows a sectional view of the disk in the case where the track pitch is varied based on the conversion table shown in FIG. 4A. FIG. 4B depicts a view of the track being based on the actual servo information and a view of the apparent track that the host recognizes. The outer side is the vicinity of the outer edge of the disk and the inner side is the vicinity of the spindle. The track numbers start with Track Number 0 (zero) from the outer side and they monotonously increases.

Here, it is assumed that the total number of the track is x and the zones are three (3) from zone $z1$ to zone $z3$. It is also assumed that x1 tracks from the outer side are assigned to the zone $z1$, the next x2 tracks are assigned to the zone $z2$ and the next x3 tracks are assigned to the zone $z3$. The coefficient 43 for each zone is f1, f2 and f3, respectively.

The bordering positions between zones shown in FIG. 4B are calculated as follows. First, an apparent final track number $\alpha 1$ for the zone $z1$ is calculated.

The apparent final track number a 1 for the zone $z1$ is obtained by multiplying x1 by the inverse number of f1. That is:

$$\alpha_1 = x_1 \times \frac{1}{f_1} \qquad [\text{Eq. 2}]$$

In the zone $z1$, since the coefficient to restore the apparent track number to the track number being based on the actual servo information is f1, the apparent final track number is obtained by multiplying the track number being based on the actual servo information by the inverse number of the coefficient.

The apparent starting track number for the zone z2 is a number obtained by adding one (1) to the apparent final track number a 1 for the zone z1. Next, the apparent final track number α2 for the zone z2 is calculated. It can be obtained by adding the product of the inverse number of f2 and x2 to the apparent final track number α1 for the zone z1. That is:

$$\alpha_2 = \alpha_1 + x_2 \times \frac{1}{f_2} \quad [\text{Eq. 3}]$$

Similarly, the apparent starting track number for the zone z3 is a number obtained by adding one (1) to the apparent final track number α2 for the zone z2, and the apparent final track number α3 for the zone z3 is obtained by adding the product of the inverse number of f3 and x3 to the apparent final track number α2 for the zone z2. That is:

$$\alpha_3 = \alpha_2 + x_3 \times \frac{1}{f_3} \quad [\text{Eq. 4}]$$

In this manner, the host recognizes that this disk has the tracks numbered from zero (0) to a 3 and has three (3) zones having different track pitches respectively. The apparent track number of a zone border is varied and the apparent track pitch is varied for each zone according to the size of the coefficient 43 set for each zone.

Then, using the conversion table shown in FIG. 4A, an equation for converting the apparent track number into a track number being based on the actual servo information. It is assumed that the apparent track number to be the target position designated by an order from the host is y and a zone to which the apparent track number belongs is zi (i=1, 2, 3).

An actual track number T (i, y) corresponding to the apparent track number y and the zone number i can be represented as follows.

$$T(i, y) = y f_i + \sum_{k=1}^{i-1} (f_k - f_{k+1}) \alpha_k \quad (A) \quad [\text{Eq. 5}]$$

Here, fi is the conversion coefficient 43 corresponding to the zone z1 and αi is an apparent final track number corresponding to the zone z1. The apparent final track number is the maximum of the apparent track numbers in the zone.

The method for obtaining the equation (A) is as follows. Because of the conversion coefficient 43 contained in FIG. 4A, in the zone z1, information is written at a track pitch f1 times as wide as the constant track pitch. Similarly, in other zones, f2 times as wide in the zone z2 and f3 times as wide in the zone z3, respectively.

Therefore, in order to obtain the track number based on the actual servo information from the apparent track number, how many track numbers exist before the apparent track number from the starting track number in the zone is obtained and, a first value obtained by multiplying the number obtained as above by the conversion coefficient 43 set for the zone, is added to a second value being the actual track number corresponding to the starting track number for each zone. By generalizing and modifying this operation, the equation (A) is obtained. The equation (A) can be applied to the case where the number of zones is n (n is a natural number).

As described above, the servo information is recorded on the disk at the constant track pitch and the conversion table for varying the track pitch for each of the plurality of zones is stored in the flash ROM and, thereafter, the host 22 checks the capacity of the disk.

Without the conversion table, the recording apparatus responds with the number of tracks formed such that the track pitch is the constant track pitch according to the servo information, and with the conversion table, it responds with the number of tracks on which the track pitch varied for each of the zones is reflected. In this manner, when the host 22 designates an address, the number of tracks that is responded with is the upper limit.

Then, the host issues an order to write or an order to read information to tracks determined by the apparent track numbers. The recording apparatus converts the apparent track numbers into a track numbers being based on the actual servo information, moves the head to that track (this operation is referred to as "seeking process of head") and executes writing or reading of information to that track.

In the embodiment of the invention, the servo information is recorded on the disk in advance such that the tracks are spaced equally and each of the tracks is managed by an integer number. Then, the embodiment is wherein information is written on the apparent tracks by causing the head follow tracks represented by a decimal when the information is written. Then, the information written on those apparent tracks is read. Now, an example of a method for causing the head to follow the tracks represented by decimal places will be described.

Figure 5:
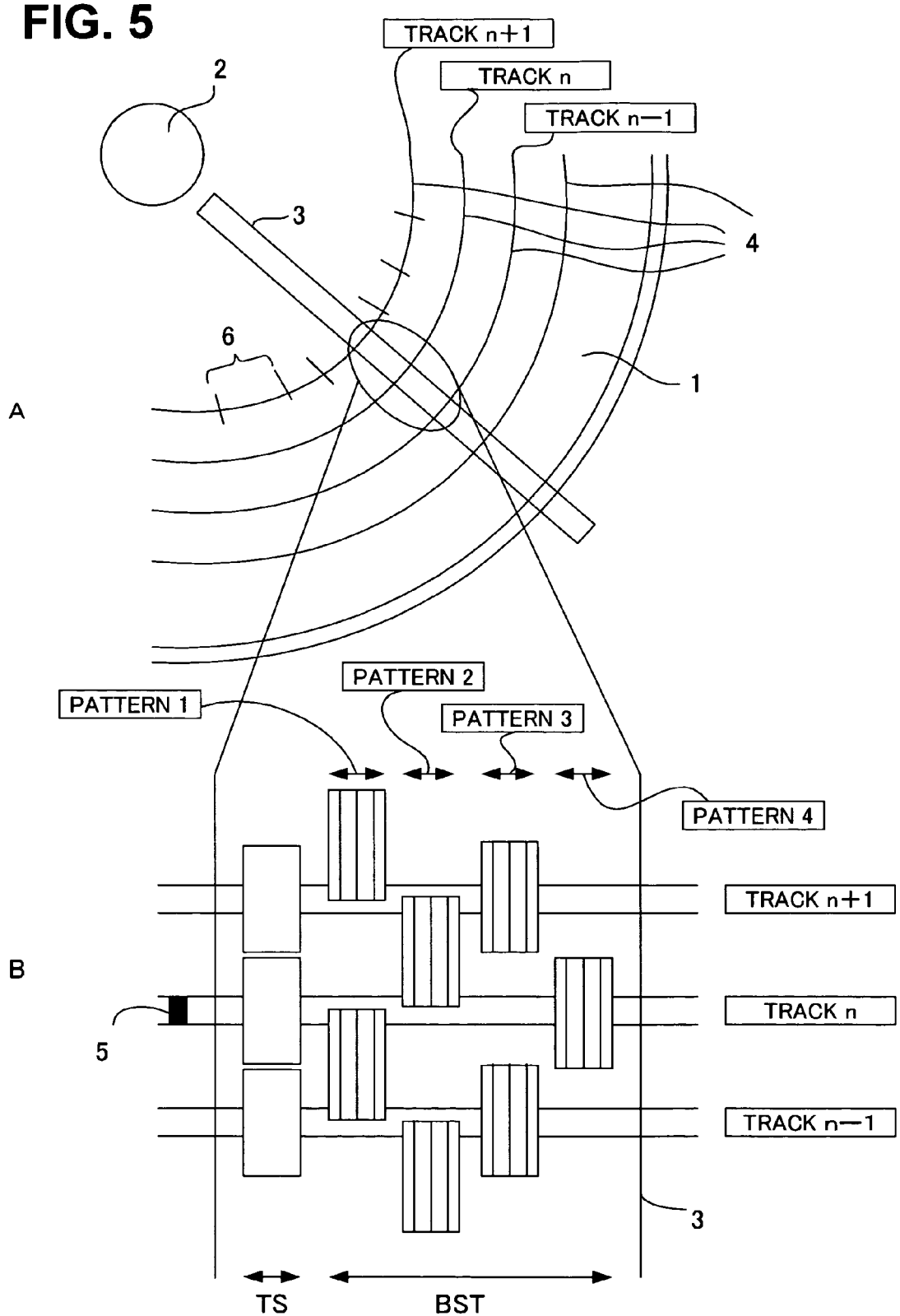
FIGS. 5A and 5B shows the view of the servo information written on the disk.

FIGS. 5A and 5B show a view of the servo information written on the disk shown in FIG. 2. FIG. 5A shows the servo information recorded on the disk and tracks formed by the servo information. The servo information has been recorded on the disk before the shipping of the product such that the spacing between tracks is constant. To each of the tracks, a number as an integer such as, for example, from zero (0) are assigned one after another from the outer side and these track numbers are included in the servo information.

FIG. 5B illustrates an example of information included in the servo information. It is a view featuring a portion relating to three (3) tracks (a track n−1, a track n and a track n+1) adjacent to each other in the tracks shown in FIG. 5A. Each of the tracks has a predetermined width according to the width of the head 5. The head 5 moves along the tracks 4 and comes over the servo pattern 3.

The servo information is recorded in the servo pattern 3 and the servo information includes a track sector number recording area TS where the track number and the number given to the sector 6 formed by partitioning the track is recorded, and an area BST where a burst signal for measuring the relative position of the head and the track is recorded. The burst signal is recorded shifted such that, for example, for four (4) different patterns as shown in FIG. 5B, the signal for each of the patterns does not overlap any with each other.

Then, based on the amplitude of each pattern reproduced by the head when it comes over the area where the burst signal is recorded, a position where the head is relatively seated between a track and another track adjacent to the track is calculated. On the contrary, by controlling the head to be present at a position at which the amplitude obtained by reproducing the burst signal has a predetermined value for each pattern, head can be caused to follow the track even when the head is in the middle of two (2) tracks.

For example, in the case where the head is caused to follow the track n, the difference between the amplitudes of the burst signals Bst1 and Bst2 reproduced by the head when the head comes over the servo patterns 3 shown in FIG. 5B is zero (0). On the contrary, on a track for which a track number demodulated from the track sector number recording area TS is n, the head can be caused to follow the center of the track n by controlling the position of the head such that the amplitude difference between reproduced waveforms from the burst signals Bst1 and Bst2 is zero (0).

Furthermore, in order to cause the head to follow exactly in the middle of, for example, the track n and the track (n+1), the position of the head should be adjusted such that the amplitude difference between the reproduced waveforms from the burst signals Bst3 and Bst4 is 0(zero). By varying the amplitude difference between the reproduced waveforms from the burst signals Bst3 and Bst4, the head can be caused to follow at an arbitrary position between the tracks.

In this manner, the head can be caused to follow the position in the middle of tracks on each of which an integer track number is recorded respectively. This position in the middle of the tracks is represented by decimal track numbers. For a position in the center of the track n and the track n+1, it is represented as "track n+0.5" and, for a position one tenth (1/10) of the track pitch away from the track n to the track n+1, it is represented as "track n+0.1". In this manner, the head can be caused to follow a decimal track represented.

Then, the seek process will be described.

Figure 6:
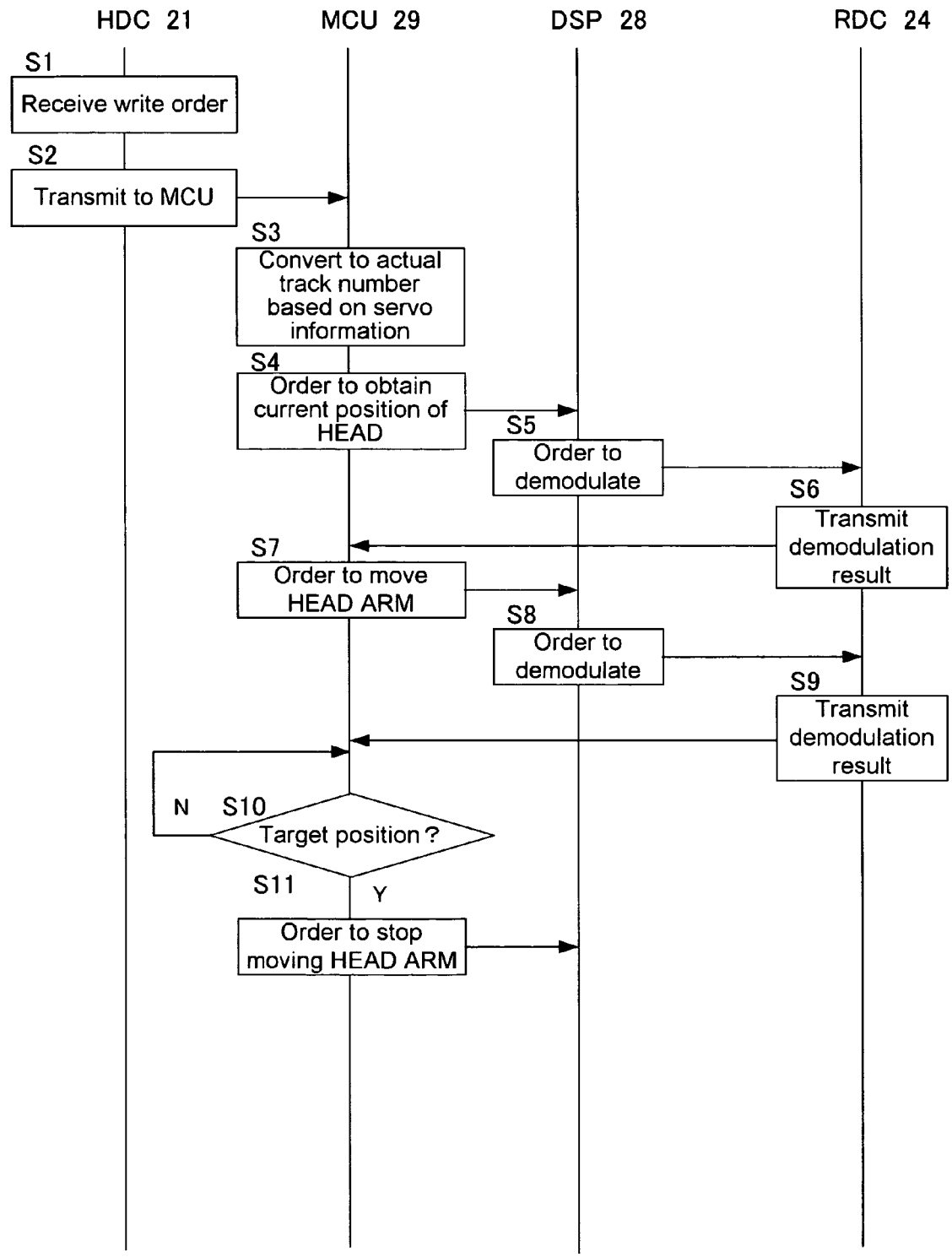
FIG. 6 shows a flowchart illustrating a seeking process.

FIG. 6 shows a flowchart illustrating the process for the recording apparatus, having received an order to write or an order to read, to cause the head seek to the target track. In FIG. 6, the process is described for a case where an order to write is received. First, the HDC 21 receives an order to write from the host 22 (S1).

The data to be written is stored in the data buffer 23. Then, the HDC 21 transmits a track number to the MCU 29 (S2). In the order to write, the track number of the target track on which information is written is included and the MCU 29 converts it into a track number being based on the actual servo information using the conversion table shown in FIG. 4A (S3). This is because the received track number is an apparent track number.

Then, in Step S3, the zone to which the received track number belongs is obtained from the FIGS. 4A and the received track number and the obtained zone number are inputted into the equation (A). When the track number after conversion is not an integer, the head can be caused to follow, for example, along a decimal track number assuming that the significant figures are two decimal places.

Then, the MCU 29 stores the track number after conversion in the RAM 32. Next, the MCU 29 issues an order to obtain the head position to the DSP 28 in order to obtain the servo information of the current position of the head (S4).

The DSP 28 orders the read channel 24 to demodulate the current position of the head from the servo information and to transmit the demodulation result to the MCU 29 (S5). The read channel 24 transmits to the MCU 29 the position information of the head as the result of the demodulation of the servo information (S6). As described referring to FIG. 3, the head position information as the result of the demodulation includes the track number and the reproduced waveform of the burst signal.

The MCU 29 compares the current position of the head transmitted in Step S6 with the track number stored in the RAM 32 after Step S3, determines which of the inner side or the outer side the head arm 7 should be moved toward from the current position and orders the DSP 28 to move the head arm (S7). The DSP 28 orders the servo control unit 30 to move the head arm 7 and orders the RDC 24 to demodulate the track number from the servo information read during the move of the head and to transmit the result of the demodulation to the MCU 29 (S8).

The RDC 24 reads the servo information every time the head comes over the servo pattern, demodulates it into information including the track number and the reproduced waveforms of the burst signals using the servo demodulating unit 26 and transmits the information to the MCU 29 (S9). MCU 29 calculates the position of the head as a decimal track number based on the track number and the reproduced waveforms of the burst signals included in the demodulation result and determines whether or not the calculated track number coincides with the target track number stored in the RAM 32 (S10).

When it coincides with the target track number in Step S10, that indicates the head has reached the target position and the MCU 29 orders the DSP 28 to stop moving the head arm 7 (S11) and the seeking process ends. Then, the MCU 29 orders the HDC 21 to transmit the data to be written stored in the data buffer to the RDC 24 and the information is written from the head position after seeking. When it does not coincides with the target track number in S10, the process returns to S7 to move the head until it reaches the target position and the process continues.

The process shown in FIG. 6 is the seeking process for writing, however, the seeking process for reading is same. However, in the case of reading, what is different from that of writing is that, the data to be written is not stored in the data buffer 23 in Step S1, however, the data read from the head position after Step S11 is stored in the data buffer 23. Furthermore, this process has been described for the case where the disk has a plurality of zones, however, the process is applicable to the case where the disk has only one (1) zone as shown in FIG. 3.

Figure 7:
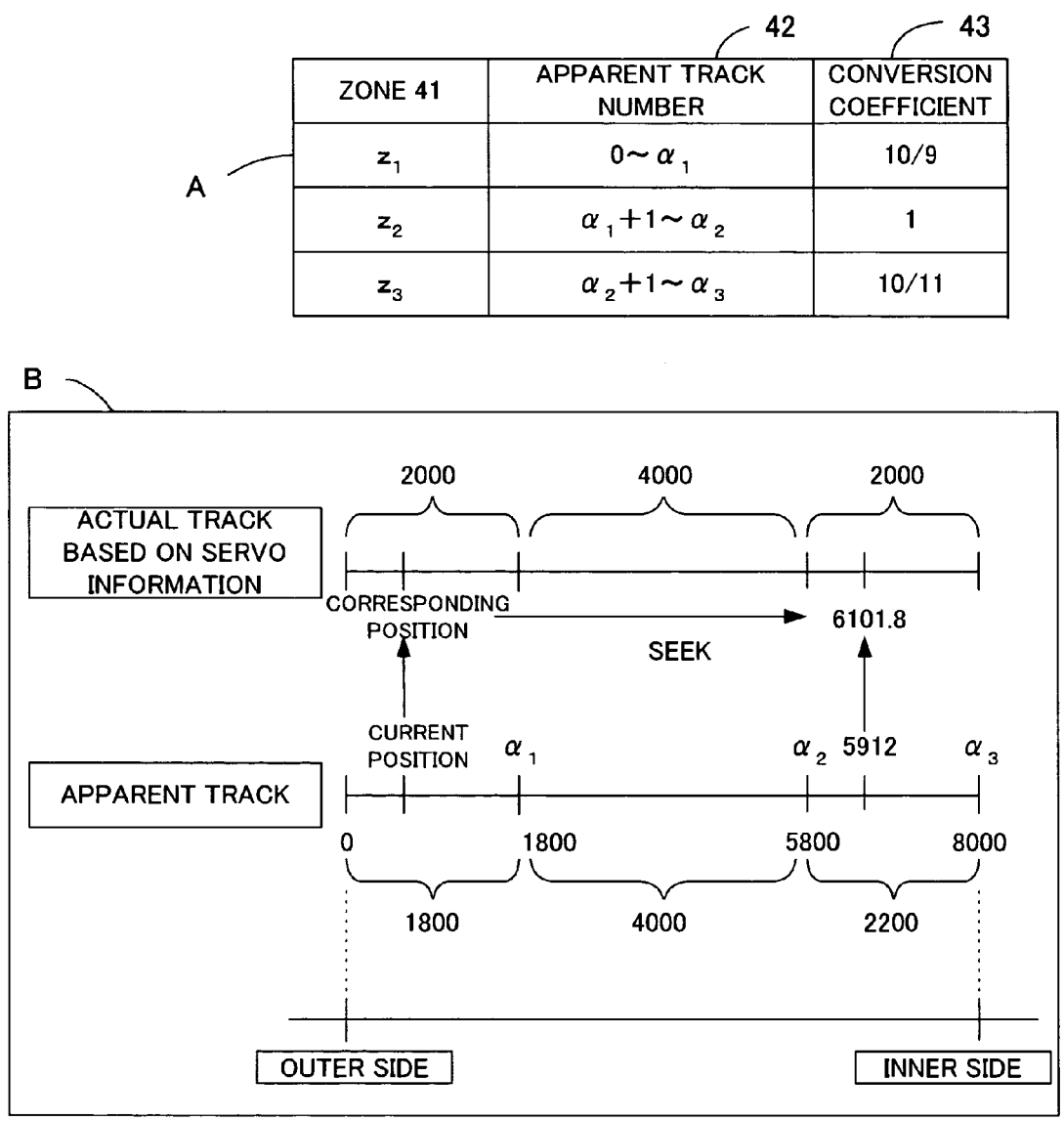
FIGS. 7A and 7B illustrate a detailed example of the case where the zones are plural.
Figure 8:
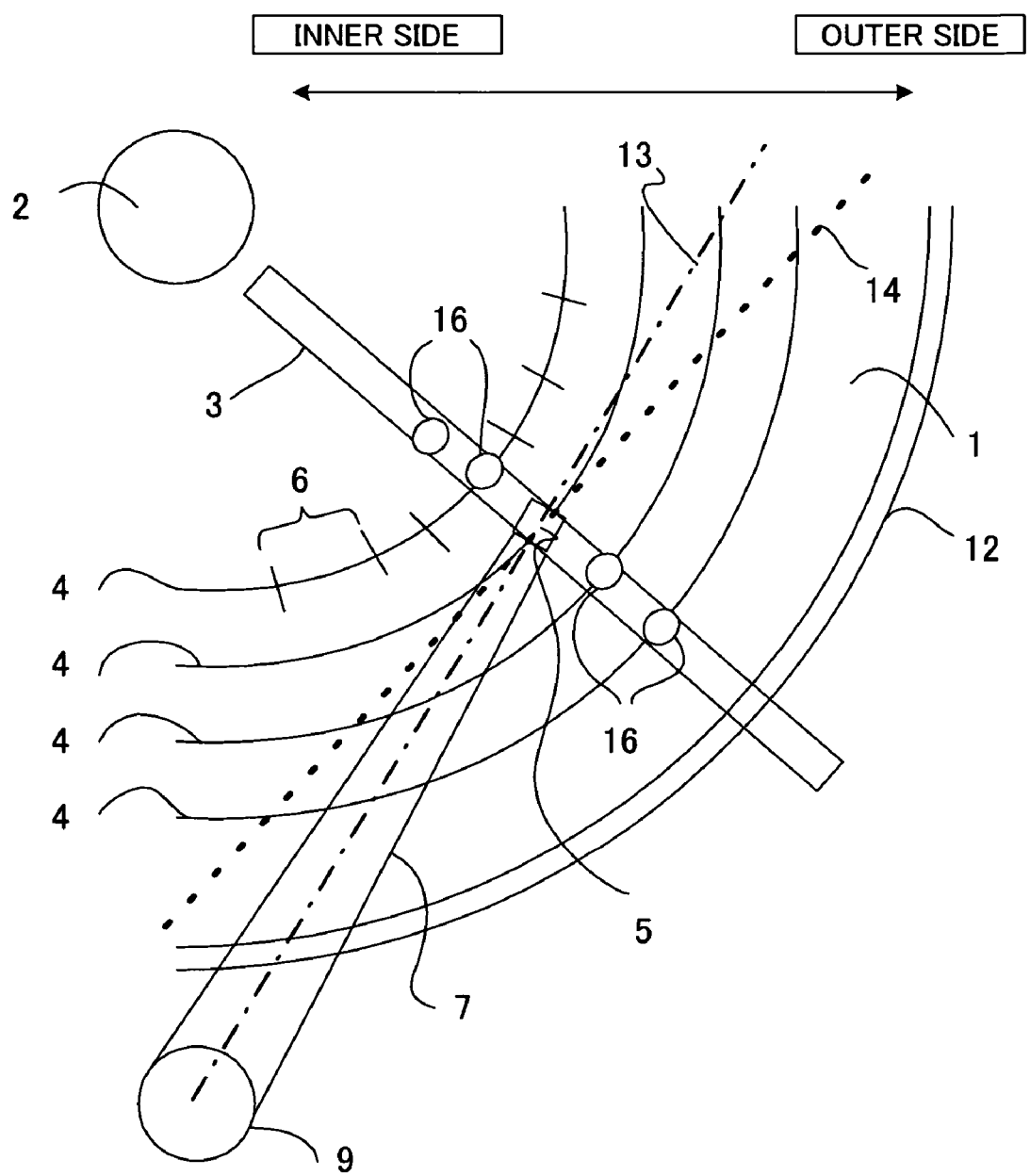
FIG. 8 shows a view featuring the disk contained in the recording apparatus.
Figure 9:
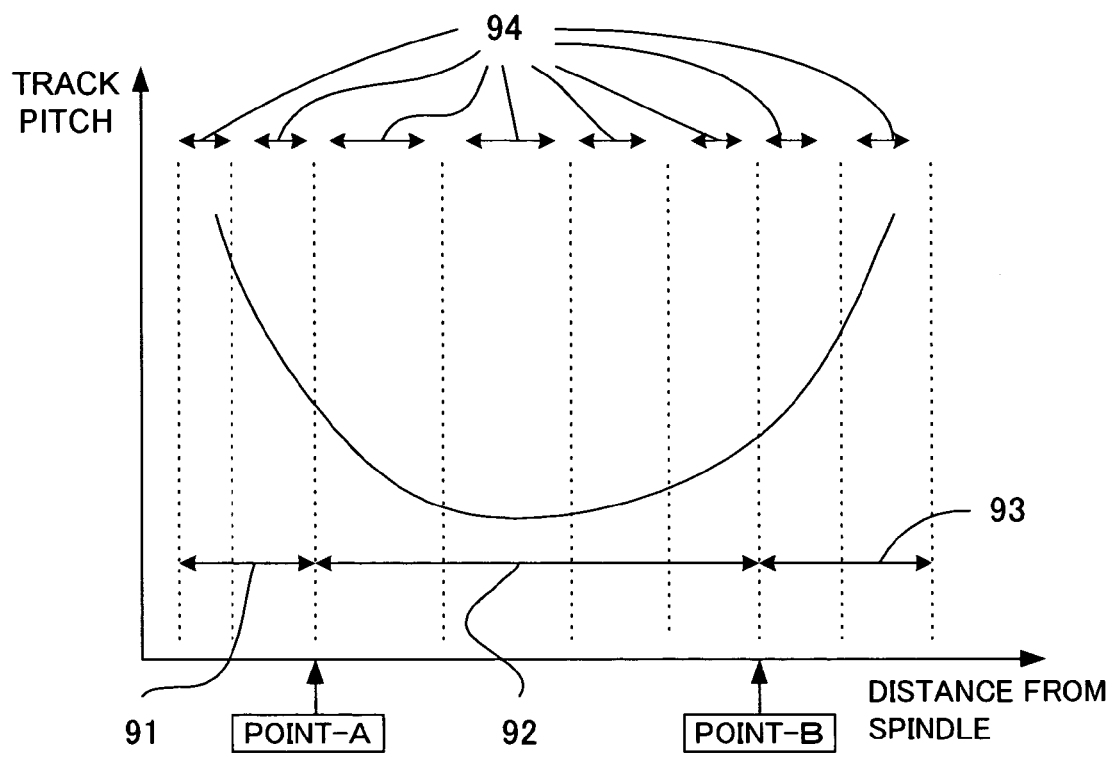
FIG. 9 is a graph showing the relation between the distance from a spindle and the track pitch.

Finally, the embodiment of the invention will be described with specific values. FIGS. 7A and 7B are diagrams for describing a specific example of the case where zones are plural. FIG. 7A is a conversion table used in this specific example. Here, as an example, it is assumed that the total number of tracks is 8,000; a coefficient of 9/10 is set for 2,000 tracks from the outer side for the zone z1; a coefficient of 1.0 is set for the next 4,000 tracks for the zone z2; and a coefficient of 11/10 is set for the last 2,000 tracks for the zone z3.

FIG. 7B shows a sectional view of the disk when the track pitch is varied based on the conversion table shown in FIG. 7A. The apparent last track numbers $\alpha_1$, $\alpha_2$, $\alpha_3$ respectively for each zone shown in FIG. 7B are calculated respectively as follows.

$$\alpha_1 = 2000 \times \frac{9}{10} = 1800,$$

$$\alpha_2 = 1800 + 4000 \times 1 = 5800,$$

$$\alpha_3 = 5800 + 2000 \times \frac{11}{10} = 8000$$

[Eq. 6]

As above, it is seen from the host 22 that there are 1,800 tracks in the zone z1, 4,000 tracks in the zone z2 and 2,200 tracks in the zone z3.

This indicates that, in the zone z1, there are only 1, 800 tracks in an area where 2,000 tracks can be present at the constant track pitch and the track pitch in this zone is widened than the constant track pitch. This also indicates that, in the zone z3, there are 2,200 tracks in an area where 2,000 tracks can be present at the constant track pitch and the track pitch in this zone is narrowed than the constant track pitch. In this manner, the track pitch can be varied from the track pitch being based on the actual servo information by whether or not the coefficient is larger than one (1).

Furthermore, it is assumed that a seek order is issued from the host 22 for the track number 5912. Since the above track number designated by the host 22 is an apparent track number, it is converted into a track number being based on the actual servo information according to Step S2 shown in FIG. 6.

It can be seen from the conversion table shown in FIG. 7A that the actual track number corresponding to the track number 5912 belongs to the zone z3. Therefore, according to the equation (A):

$$T(3,5912) = 5912 \times f_3 + (f_1 - f_2)\alpha_1 + (f_2 - f_3)\alpha_2 \quad [\text{Eq. 7}]$$
$$= 5912 \times \frac{10}{11} + \frac{1}{9} \times 1800 + \frac{1}{11} \times 5800$$
$$= 6101.8181$$

Therefore, by rounding the second decimal place and latter places, 6101.8 is obtained as the track number based on the actual servo information. Then, the seeking process ends when the RDC 24, according to the track numbers in the servo information read while it moves the head, has moved the head to a position between a track having the Track Number 6,101 and a track having the Track Number 6102, where the ratio of the bust signals from the above two (2) tracks corresponds to the figure (8) in the first decimal place.

According to the embodiment of the invention described above, it is possible to set arbitrary zones and vary the track pitch for each zone for a disk on which the servo information is written at the constant track pitch. Furthermore, writing and reading of information are executed using track pitches varied for each zone. However, since the seeking process is executed using the servo information written actually, the conventional program of the seeking process can be used without making any change to it and the seeking process becomes stable.

Thereby, the servo information may be written on the disk at the constant track pitch and, since it is not necessary to calculate the optimal value of the track pitch for each zone for each head when the servo information is written, it is possible to reduce the time necessary for writing the servo information compared to the conventional length of time. Furthermore, even when the performance of the head is higher or lower than the predetermined standard, without re-writing the servo information once written at the constant track pitch, any arbitrary track pitch can be realized by storing in the flash ROM before the shipping of the product the conversion table in which the optimal track pitch for each zone according to the performance of each head is set and, thereby, it is possible to improve the yield of the heads. The storing operation of the conversion table used by the firmware can be completed in a shorter time than the time necessary for re-writing the servo information.

In the embodiment of the invention, the head is caused to follow a track having a decimal track number using the burst signals, however, this is possible in other methods and the invention is applicable to such cases.

Furthermore, in the embodiment of the invention, the seeking process is executed by, first, converting the apparent track number being the target position contained in the order from the host into a track number being based on the actual servo information, and comparing the track number after conversion with the track number (including decimal ones) demodulated from the servo information. However, after improving the method of demodulating of servo information, the seeking process can also be executed by converting each time the track number (including decimal ones) being based on the actual servo information to an apparatus track number and comparing the track number after conversion and the apparent track number being the target position included in the order from the host.

Furthermore, the methods to record the servo information on the disk include two (2) cases of the case where, after setting the disk in the HDD, the servo information is written by a head of the HDD based on a program stored in an ROM (Read Only Memory) not shown and the case where, using a servo track writer (hereinafter, referred to as "STW") being a dedicated device for writing the servo information, the servo information is written by a head equipped at the STW on a disk before incorporating it into the HDD. Not specifically shown, the STW is also provided, as shown in FIG. 2, with a head for writing the servo information, a head arm moved by a voice coil motor around a pivot as its shaft, an inner stopper, an outer stopper, a spindle for rotating the disk installed. Then, the invention is applicable to a recording apparatus having a disk on which the servo information is recorded in either of those methods.

Furthermore, although in the description of the embodiment the stoppers are employed as the criteria of position, the criteria are not limited to these and the case is applicable where specific tracks are employed as the criteria.

While the illustrative and presently preferred embodiment of the present invention has been described in detail herein, it is to be understood that the inventive concepts maybe otherwise variously embodied and employed and that the appended claims are intended to be construed to include such variations except insofar as limited by the prior art.

What is claimed is:

1. A head control method controlling movement of a head on a discoidal recording medium on which position information is stored at radially equal spacing, a plurality of virtual tracks are formed corresponding to said position information, and a plurality of concentric zones are formed each of which includes a predetermined number of said plurality of virtual tracks, said head controlling method comprising the steps of:

presetting in each of said plurality of zones a coefficient obtained by dividing a pitch of an actual track with a pitch of a virtual track, a pitch of actual tracks on which data is actually written or read being constant in each of said plurality of zones;

obtaining a position of said head for reading or writing data by summing up said coefficients from the outermost or innermost virtual track, to the virtual track on which data is written or read;

moving said head to a position of said position information reproducing signal corresponding to said obtained head position; and writing or reading data at the obtained head position.

2. The head control method according to claim 1, wherein the coefficient is a ratio of spacing between positions where the position information is recorded and spacing between positions partitioning each of the zones equally.

3. A recording apparatus comprising:

a discoidal recording medium on which position information is stored at radially equal spacing, a plurality of virtual tracks are formed corresponding to said position information, and a plurality of concentric zones are formed each of which includes a predetermined number of said plurality of virtual tracks;

a head for writing information onto or reading written information from the discoidal recording medium;

a head driving unit for moving the head on the discoidal recording medium;

a control unit for controlling the position of the head; and a storage unit for storing information necessary for the control, wherein pitches of actual tracks on which data is actually written or read are constant in each of said plurality of zones;

a coefficient obtained by dividing a pitch of said actual tracks with a pitch of said virtual tracks is preset in each of said plurality of zones;

the storage unit stores in advance a coefficient for each of the zones;

the head obtains a position of the head for reading or writing data by summing up said coefficients from the outermost or innermost virtual track, to the virtual track on which data is written or read;

the head driving unit moving said head to a position of said position information reproducing signal corresponding to said obtained head position; and the head writes or reads data at the determined head position.

4. The recording apparatus according to claim 3, wherein the coefficient is a ratio of spacing between positions where the position information is recorded and spacing between positions partitioning each of the zones equally.

5. The recording apparatus according to claim 3, wherein the recording apparatus has a plurality of heads, and the ratio is set in the storage unit for each of the plurality of heads.

6. The recording apparatus according to claim 4, wherein the recording apparatus has a plurality of heads, and the ratio is set in the storage unit for each of the plurality of heads.

* * * * *